United States Patent [19]

Nuber

[11] Patent Number: 4,822,253

[45] Date of Patent: Apr. 18, 1989

[54] MACHINE INSTALLATION FOR A HEAT PUMPING PLANT

[75] Inventor: Roland Nuber, Lindau, Fed. Rep. of Germany

[73] Assignee: Wankel GmbH, Berlin, Fed. Rep. of Germany

[21] Appl. No.: 908,337

[22] Filed: Sep. 17, 1986

[51] Int. Cl.$^4$ .................. F04B 35/00; F04B 39/06
[52] U.S. Cl. .................... 417/364; 62/506; 418/85; 417/372
[58] Field of Search .......... 417/364, 372; 418/83, 418/85, 15; 62/506, 181; 123/242

[56] References Cited

U.S. PATENT DOCUMENTS

| | | | |
|---|---|---|---|
| 1,902,315 | 3/1933 | Vogt | 418/15 |
| 1,952,005 | 3/1934 | Willenberg | 417/364 |
| 2,286,316 | 6/1942 | Snook | 417/364 X |
| 2,677,944 | 5/1954 | Ruff | 418/85 X |
| 4,182,127 | 1/1980 | Johnson | 417/364 X |
| 4,268,231 | 5/1981 | Corwin et al. | 418/60 |
| 4,566,412 | 1/1986 | Tadokor et al. | 123/242 |

FOREIGN PATENT DOCUMENTS

6072434 10/1986 Japan .................... 418/15

*Primary Examiner*—Leonard E. Smith

*Attorney, Agent, or Firm*—Becker & Becker, Inc.

[57] ABSTRACT

A heat-pump arrangement with an installation consisting of a motor and a compressor of trochoidal type construction adapted to conditions of heat pump systems to have the smallest structural size and nominal heat spread arranged between heat storage or accumulator and outlet large heat quantities per time unit passing therethrough as well as also being able to operate economically at low partial load range of operation. An intermediate part is provided between a motor and a compressor. Two annular chambers are arranged parallel and axially next to each other. An annular chamber is located toward the motor. The middle part has a dual-arc troichoidal-shaped casing or mantle runway and two side parts which have an eccentric shaft passing therethrough at right angles to the side parts; a triangular piston rotates upon an eccentric of the eccentric shaft for the motor and a compressor of the same type of construction is also arranged on the same eccentric shaft shared in common with the motor. The pistons and the eccentrics of the two machines balance or counterbalance each other during corresponding displacement of piston positioning so that a considerable shortening of the axial structural length is attainable along with a quietness of running of the machines.

10 Claims, 6 Drawing Sheets

MACHINE INSTALLATION FOR A HEAT PUMPING PLANT

BACKGROUND OF THE INVENTION

1. Field of the Invention

This invention concerns a machine installation of a drive motor of a rotary piston trochoidal type of construction and a compressor of the same type of construction including a housing consisting of a center part with a dual-arc trochoidal-shaped mantle runway and two side parts, which have an eccentric shaft passing therethrough at right angles. The eccentric shaft includes an eccentric upon which a triangular piston rotates.

Description of the Prior Art

Installations of power delivery or output and power receiving machines of the aforementioned type of construction are known with dual-respectively triple-arc mantle runways and triangular respectively square pistons which operate upon a common eccentric shaft and with a common circulation of a liquid or fluid cooling medium. A very complicated construction is possible with such machine installations, whereby the pistons and eccentric of the two machines balance, counterbalance or compensate each other during corresponding displacement of the piston positioning. A considerable shortening of the axial construction length is attainable. Also an improvement of the quietness of running of the machine is attainable with the manner of construction of these machines. Examples of such machines are described in German Auslegeschrift 11 44 052-Fröde and in U.S. Pat. No. 3,546,878-Yoshimura dated Dec. 15, 1970 as well as in U.S. Pat. No. 3,688,749-Wankel dated Sept. 5, 1972 and German Offenlegungsschrift 22 33 014-Eiermann et al corresponding to U.S. Pat. No. 3,918,413-Eiermann et al dated Nov. 11, 1975 as well as a divisional thereof, namely U.S. Pat. No. 3,993,029-Eiermann et al dated Nov. 23, 1976, although not in a specific utilization for heat pumps. The German Auslegeschrift 26 35 971-Eiermann et al corresponding to U.S. Pat. No. 4,127,364-Eiermann et al dated Nov. 28, 1978 describes a machine unit for a heat pump which consists of two epitrochoids—(star)—(machines) operating upon a common shaft, which however are compressor and expansion machines. A heat pump arrangement with a unit or installation consisting of a motor and compressor of the trochoidal type of construction however previously has not been described or used.

SUMMARY OF THE INVENTION

An object of the invention is to adapt such machine combinations to the conditions of a heat pump plant or arrangement having a quietness of running of the machine and such a small or nominal noise generation that the same can be employed in single family homes or small living or residence establishments and which give off the entire yield of heat energy thereof, so far as technically possible, being delivered to the primary circuit or circulation. Most of all however such heat pump installations should be able to operate economically with the smallest structural size and small heat spread between heat-storage inlet and outlet having large heat quantities passing through per time unit; also are able to operate economically at low partial load; such heat pump installation range of operation.

BRIEF DESCRIPTION OF THE DRAWINGS

This object, and other objects and advantages of the present invention, will appear more clearly from the following specification in conjunction with the accompanying drawings that show a form of construction as an exemplified embodiment.

DESCRIPTION OF PREFERRED EMBODIMENTS

Figure 1:
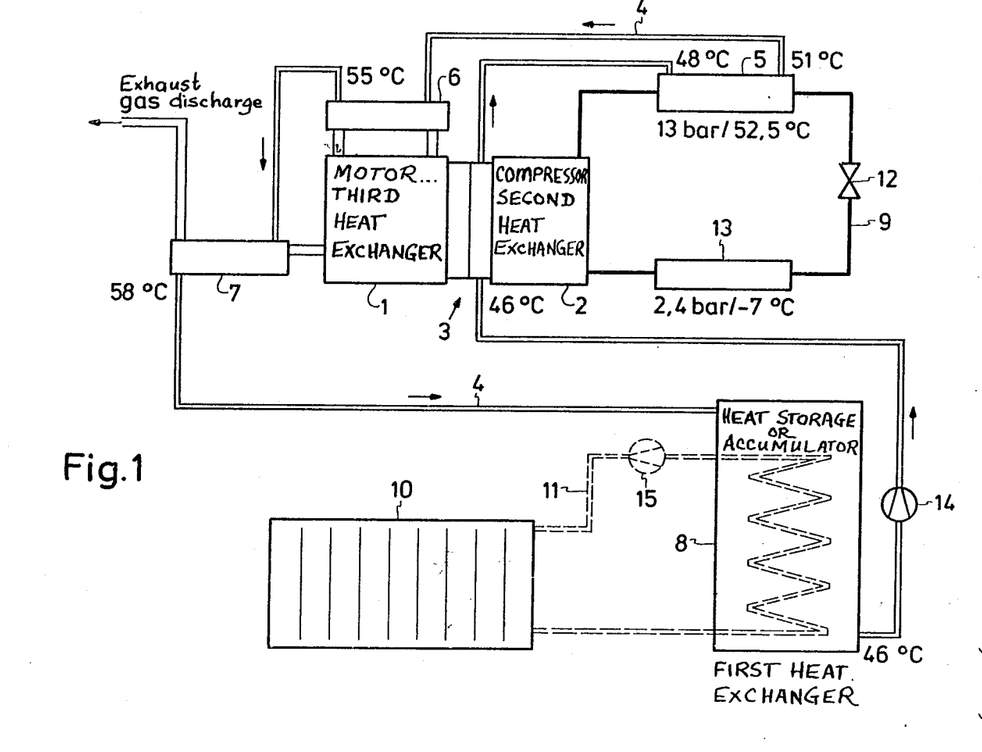
FIG. 1 is a view showing a schematic representation of a heat pump system operating with a motor-compressor unit having features in accordance with the present invention.

Referring now to the drawings in detail, FIG. 1 is a schematic diagram used as basis for description of a heat-pump system operating with the present inventive machine unit or installation. A drive motor 1 is a trochoidal machine with a dual-arc mantle or surface runway and a triangular piston which rotates upon an eccentric of an eccentric shaft passing at right angels through the sidewalls of the machine in a planetary movement. The compressor 2 has the same type of construction. The two machines including the drive motor 1 and the compressor 2 run or operate upon a common eccentric shaft, whereby these machines including the drive motor 1 and the compressor 2 balance, equalize or counterbalance each other and collectively as a compact structural unit forming the inventive machine installation 3. A primary circuit or circulation 4 having water as the operating medium is conveyed through the housing of the compressor 2 and from there consecutively through a condensor 5, a motor-cooling-water-heat exchanger 6 and a motor-exhaust-heat exchanger 7 to a heat storage or accumulator 8 and back from this accumulator again to the housing of the compressor 2. The primary circuit thereby or with that first receives the waste heat of the compressor 2, the compression heat of a circuit 9 of the operating medium of the compressor 2, the cooling water heat and then the waste or exhaust gas heat of the motor 1 and then giving off such heat in the heat storage or accumulator 8 relative to a secondary circuit or circulation 11 going through a heating body or radiator 10. An expansion valve 12 and an evaporator 13 are provided in the circuit 9 of the operating medium after passage thereof through the condensor 5. The primary circuit 4 is kept operating via a circulating pump 15. In this manner, not only the compression heat produced by the compressor 2, but rather also besides the residual heat level of the secondary circuit additionally the waste-heat of the machine installation can be kept working and in motion.

The heat-temperature profile, shape or outline determined in a practical test is set forth in FIG. 1 as an example in degrees centigrade and moreover beginning from a start at the heat storage or accumulator 8 and at the inlet of the housing of the compressor 2 being designated as 46° C.; after this at the inlet or entry to the condensor 5 being designated with 48° C.; at the output or outlet of the condensor 5 being designated with 51° C.; at the output or outlet of the motor-exhaust gas-heat exchanger 7 being designated with 58° C. The circuit 9 of the working or operating medium of the compressor 2 after the evaporator 13 with a pressure of 2.4 bar has −7° C.; in the condensor 5 at 13 bar having 52.5° C. Accordingly between the outlet or output of the heat storage or accumulator 8 and the entry or input thereof there was encountered and gained a rise of 46° C. to 58° C. from working capacity or operation efficiency and waste heat of the machine installation 3 in the system for a total of 12° C. rise or increase, whereby a very large through-passage of heat quantity is made possible with the employed machines.

Figure 2:
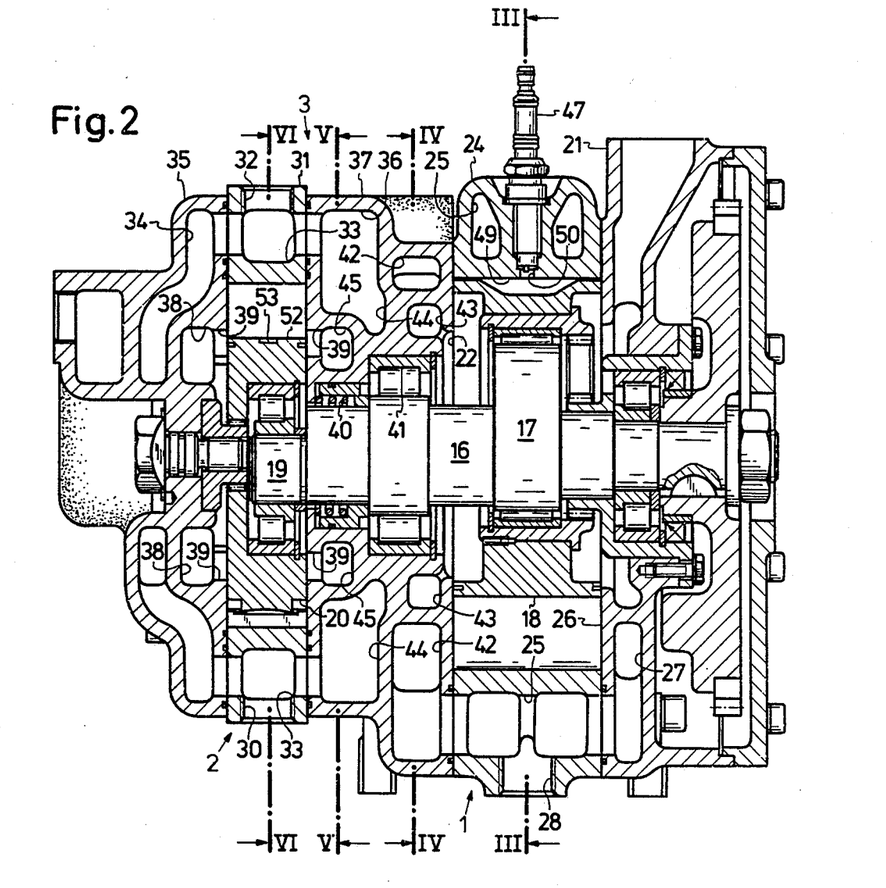
FIG. 2 is a view showing an axial section through a motor-compressor unit according to the present invention taken along the line II—II in the illustrations of FIGS. 3, 4, 5 and 6.
Figure 3:
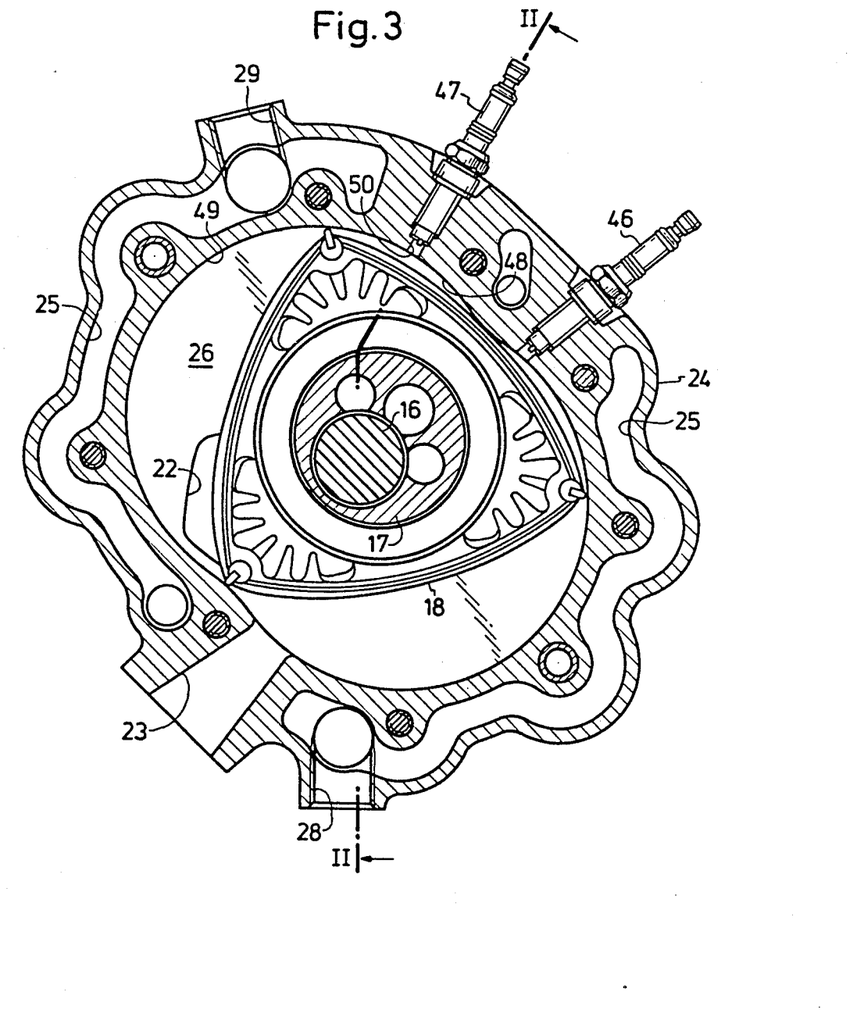
FIG. 3 is a view showing a radial section through a motor of the same machine unit as in FIG. 2 taken along a plane of line III—III in FIG. 2.

FIG. 2 is an axial section taken through the machine arrangement or installation 3 to illustrate at the right the motor 1, at the left the compressor 2, having a common eccentric shaft 16 for the motor 1 and the compressor 2; the piston 18 of the motor 1 rotates upon an eccentric 17 of the eccentric shaft 16 and a piston 20 of the compressor 2 rotates upon an eccentric 19 of the eccentric shaft 16. The motor 1 receives fresh air via the suction struts or support connections 21 and side inlet openings 22. An outlet passage 23 is illustrated in FIG. 3 and the exhaust or waste gases come from this outlet or exhaust passage 23 into the heat exchanger 7. The cooling water chambers 25 in a mantle or housing part 24 of the motor 1 are designated in FIGS. 2 and 3; those water cooling chambers 25 in the right side part 26 thereof are designated therein also in FIGS. 2 and 3. The cooling water enters into the mantle part 24 at the inlet opening 28 as coming back from the heat exchanger 6 and the cooling water discharges from the mantle part 24 at the discharge opening 29 of FIG. 3 and from there returns again into the heat exchanger 6.

The primary circulation 4 enters from the heat storage or accumulator 8 and an inlet 30 into the mantle part 31 of the compressor 2 and discharges from the heat storage or accumulator 8 via an outlet 32 from which the circulation leads to the condensor 5. The water of this circulation or circuit flows through the hollow spaces or chambers 33 in the mantle part 31, the hollow chambers or spaces 34 in the side part 35 and further hollow spaces or chambers 36 in the middle or center part 37. These hollow spaces or chambers 33, 34, 36 surround the inlet passages or channels 38 for the working or operating medium of the compressor 2, which working medium enters into the working chambers thereof at the side inlets 39.

Figure 4:
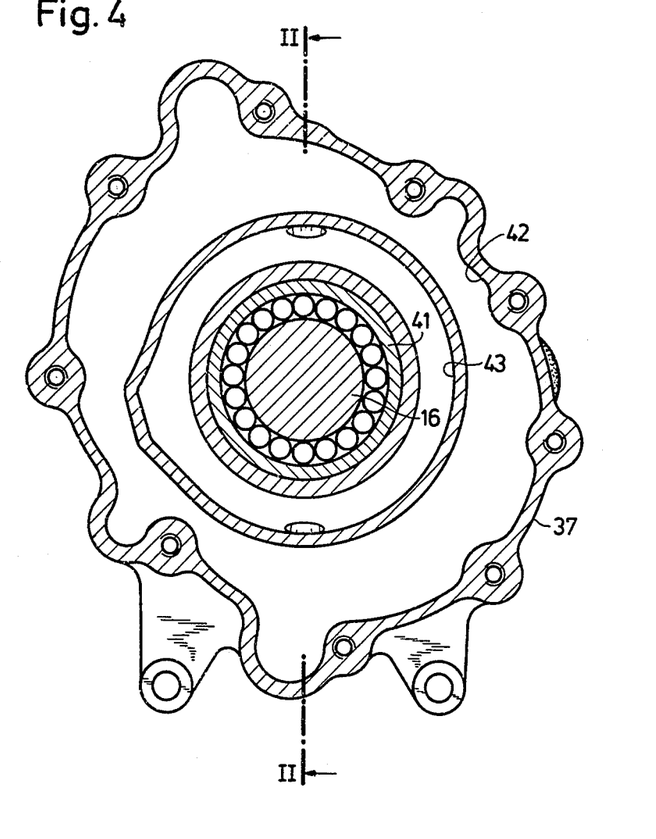
FIG. 4 is a view showing a radial section through the intermediate disk or plate between the motor and compressor of the same machine unit as in FIG. 2 taken in a plane located along the line IV—IV in FIG. 2.
Figure 5:
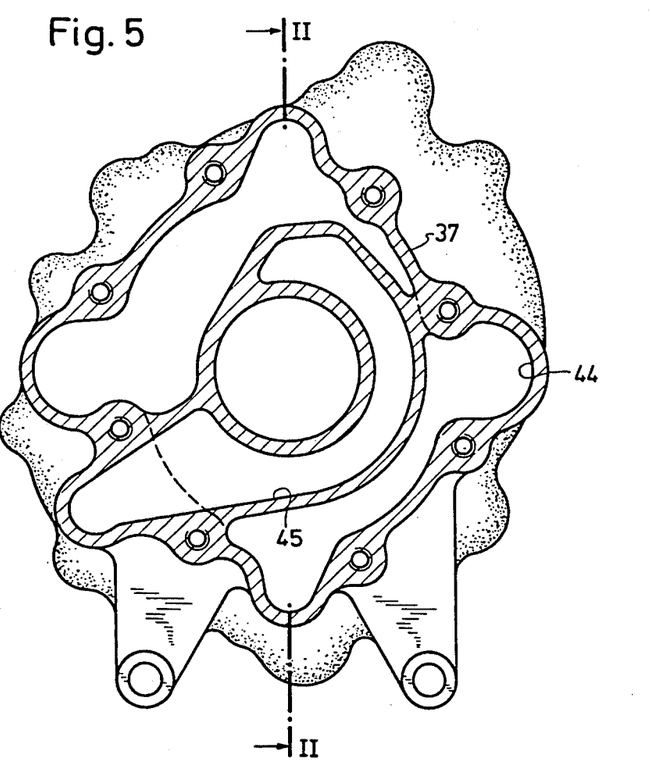
FIG. 5 is a view showing a further section through the same intermediate disk or plate as in FIG. 4 taken in a plane located along the line V—V in FIG. 2.

A seal 40 is provided around the common eccentric shaft 16 in the center or middle portions 37; this seal 40 separates the operating medium circulation or circuit 9 from the working or operating- and gas-guiding chambers of the motor 1 and also advances or runs against a middle or center bearing 41 of the eccentric shaft 16. The center or middle part 37 on the motor side of FIG. 4 has a ring-shaped or annular space or chamber 42 through which cooling water of the motor 1 flows. The chamber 42 surrounds a ring or annular chamber 43 for the suction air of the motor 1. On the compressor side according to FIG. 5, a ring or annular chamber 44 is arranged in the center or middle part 37. The ring-shaped or annular chamber 44 surrounds the supply passage or channel 45 for the working or operating medium of the compressor 2 and the inlet passages or channels 38 thereof. The two ring-shaped or annular chambers 42 and 44 extend in essence parallel with a thin intermediate wall separating them, so that the center or middle part 31 besides being effective as to the cooling function for the two machines also is effective as a heat exchanger. Moreover the ring-shaped or annular chamber 44 for the primary circuit or circulation is brought forth as far as into the vicinity of the center or middle bearing 41 and to the wall region of the center or middle part 37 stroked or swept over by the piston 18 of the motor 1. Via the heat exchange process made possible hereby, warmth or heat can be transferred or transmitted out of the cooling water of the motor into the primary circuit or circulation also, the residual or remaining heat drop is balanced or equalized between these two media subsequently in the heat exchanger 6.

Referring now to FIG. 3, the motor 1 runs in operation of such a heat pump system or arrangement in essence in a partial load range. In order to attain the best efficiency or degree of effectiveness herewith, two spark plugs 46 and 47 are provided. The spark plug 47 is set back rearwardly in direction of rotation and is arranged up to 30° as to eccentric shaft angle before the short housing axis or axle. This has a purpose to avoid an overflow of gases from the expansion chamber 48 into the compression chamber 49 via the ignition passage or channel 50 of the set-back spark plug 47. The position of this spark plug 47 accordingly is determined by the position of a respective corner of the piston 18 in a point of time in which no pressure difference exists between the two working or operating chambers 48 and 49 separated by this piston corner. Otherwise, on the other hand, the ignition channel or passage of the spark plug 46 as located in the front in rotary direction is to have as small an opening as possible with a diameter of less than 4 mm in order to reduce the gas transfer or overflow at this location.

Figure 6:
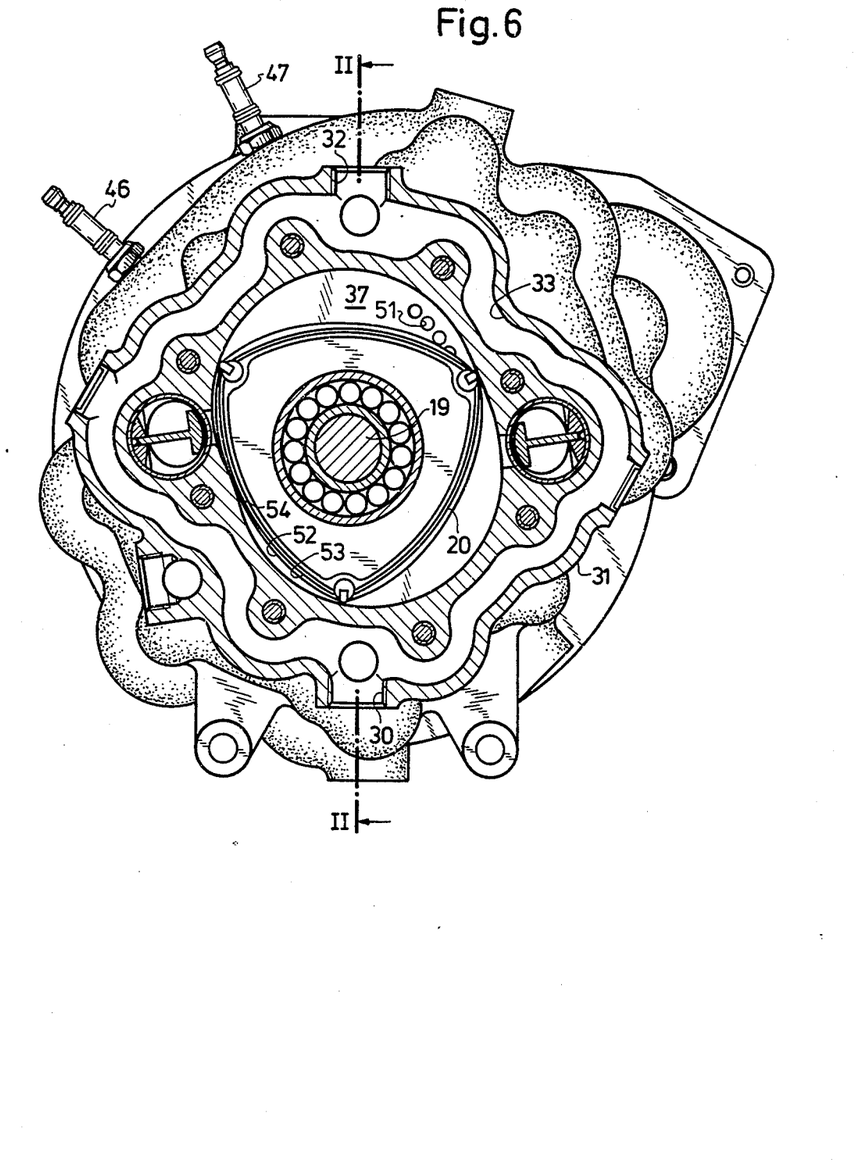
FIG. 6 is a view showing a radial section through a compressor of the same machine unit as in FIG. 2 taken in a plane located along the line VI—VI in FIG. 2.

The compressor 2 is a short-stroke unit with a r:e-ratio of 10 in order to obtain a dead space that is as small as possible. Very long-extended side inlet openings result with such a small r:e-ratio. The radial sealing strips bend-in as to the inlet openings under the slot or groove gas pressure and grinding round the control edges of the side inlet openings. Consequently it is expedient, appropriate, practical and useful to subdivide these side inlet openings via transverse webs extending transversely to the longitudinal extension thereof. Technically from a flow standpoint it is better to subdivide the conventional side inlet openings via bores 51 respectively in a row as illustrated in FIG. 6.

With such machines there is not expedient or purposeful, for avoidance of a negative torque arising during passage of the piston flank or side through a dead-point position to provide overflow passages in the housing walls which circumvent the subsequently-running or following corner of the piston flank or side traversing the dead-point position, in order to push the residual or remaining pressure gas into the subsequent or following chamber. The following part of the piston flank or side separated from the front chamber part with that was impinged or engaged with a pressure that is too high, before a shifting or pushing-over of the gas existing subject to a residual or remaining pressure has occurred. A groove 53 of not more than 1mm depth and 5mm width is provided extending in rotational direction for this reason in each of the flanks or sides 52 of the piston 20; this groove 53 bridges the narrow location or position between the axially close zone 54 and the piston flank 52 and this groove 53 (FIGS. 2 and 6) effects a pressure balance or equalization between the two chamber parts (FIG. 2).

The present invention is, of course, in no way restricted to the specific disclosure of the specification and drawings, but also encompasses any modifications within the scope of the appended claims.

What I claim is:

1. A machine installation including a Wankel-type drive motor and a refrigeration compressor, a refrigerant circuit, twin cooling chambers for the motor and the compressor and a cooling water circuit that flows through a compressor cooling chamber, a refrigerant heat exchanger, a motor cooling chamber and a motor exhaust in that order, said Wankel-type drive motor being of trochoidal type of construction with a common housing consisting of a central middle part with two-arc trochoidal-shaped mantle raceway and two side parts, which have an eccentric continuous shaft in common passing at right angles therethrough, upon an eccentric of the eccentric shaft there being a triangular piston rotating thereon and a compressor of the same type of construction as well as including a primary circuit therewith, comprising:

an intermediate part provided between said motor and said compressor, said intermediate part having two parallel annular chambers arranged axially adjacent to each other, of which one annular chamber is located toward the motor;

a first heat exchanger located in a cooling water circuit between an inlet and an outlet for flow-through of the primary circuit; and second and third heat exchangers operatively connected and associated therewith so that the annular chamber located toward the compressor is located in the primary circuit between an output of the first heat exchanger and an input of the second heat exchanger of the working medium of the compressor and furthermore that the outlet passage of the the compressor and furthermore that the outlet passage of the motor leads to a third heat exchanger for the motor exhaust gases, which third heat exchanger has flow therethrough from the primary circuit after passage through the second heat exchanger for the working medium of the compressor and then via a further head exchanger for the cooling water of the motor, whereby the outlet of this third heat exchanger for the primary circuit leads to an inlet of the first mentioned first heat exchanger.

2. A machine installation according to claim 1, in which said motor has two spark plugs located sequentially in rotational direction, whereby the position of a spark plug set back in rotational direction is determined in point of time by a corner of a piston respectively following the expansion chamber, in that in the two chambers separated by this corner of the piston 18 there prevails a pressure uniformity and equality and that the ignition passage of the front spark plug has a diameter of less than 4 mm.

3. A machine installation according to claim 2, in which said compressor has a r:e-ratio of 10 and that grooves extending the flanks of the piston in rotational direction are provided with 1mm depth and 5 mm width.

4. A machine installation according to claim 3, in which side inlet openings of said compressor for the operating medium thereof are a row of bores.

5. A heat-pump-system machine installation, consisting of a Wankel-type motor and a refrigeration compressor, a refrigerant circuit, twin cooling chambers for the motor and the compressor and a cooling water circuit that flows through a compressor cooling chamber, a refrigerant heat exchanger, a motor cooling chamber and a motor exhaust in that order, in which water as operating means carrying on the primary circulation gives off the compression heat of an operating medium circulation of the refrigeration compressor and the combustion heat of the motor to a secondary circulation delivering a consumer heat, comprising the following features:

A. said motor and said refrigeration compressor having mantle parts with trochoidal shaped dual-arc mantle running surfaces and an eccentric shaft extending continuously in common for the motor and refrigeration compressor as well as having eccentric means on the eccentric shaft each respectively having a triangular piston rotating thereon in a planetary-type movement;

B. a middle part is arranged forming a complete common housing located between the mantle parts respectively and side parts therewith;

C. means forming an outer annular chamber as well as cooling water cavities of said motor flowed through by cooling water of the water surrounding an inner annular chamber for suction air for said motor coaxial to a shaft of the machine and adjacent to said motor, said outer annular chamber being connected with the cooling water cavities of said motor and the inner annular chamber being connected with a fresh air supply pipe of the motor and the inlet openings of the operating chamber of said motor, said annular chamber being adjacent to aid motor;

D. means forming a further annular chamber provided for cooling water of the compressor in parallel relationship with respect to the outer annular chamber having water of the primary circulation flowing therethrough, said further annular chamber surrounding the supply passages for the operating medium of said refrigeration compressor; and E. a seal around the eccentric shaft means separating the operating medium circulation of said refrigeration compressor from the gas chambers of the motor in a location between said refrigeration compressor and a middle bearing of said eccentric shaft means in said middle part.

6. A machine installation according to claim 5 in which a thin intermediate wall separates the annular chamber for the cooling water of the motor and the annular chamber for the water of the primary circulation in the middle part.

7. A machine installation according to claim 5 in which the annular chamber for the water of the primary circulation extends as far as into the vicinity of the middle bearing of the eccentric shaft means and as far as to the wall chamber of the middle part grazed by the piston of the motor.

8. A machine installation according to claim 5 in which circulation of the cooling water for the motor passes via a heat exchanger which is located at the primary circulation.

9. A machine installation according to claim 5 in which water of the primary circulation is supplied via an inlet opening from a heat storage means of the primary circulation into an annular chamber located around the inlet passages for the operating medium of said refrigeration compressor.

10. A machine installation according to claim 5 in which primary circulation after passage through the heat exchanger having cooling water of the motor flowing therethrough is conveyed through a further heat exchanger having exhaust gases of the motor passing therethrough before reentry into said heat storage means.

* * * * *